United States Patent
Oksendahl et al.

(10) Patent No.: US 10,747,939 B1
(45) Date of Patent: Aug. 18, 2020

(54) DECLARATIVE INTERFACE FOR INTERACTION DESIGN

(71) Applicant: BLUEOWL, LLC, San Francisco, CA (US)

(72) Inventors: Hans Oksendahl, San Francisco, CA (US); Charles O. Schwabacher, Oakland, CA (US)

(73) Assignee: BlueOwl, LLC, San Francisco, CA (US)

( * ) Notice: Subject to any disclaimer, the term of this patent is extended or adjusted under 35 U.S.C. 154(b) by 0 days.

(21) Appl. No.: 16/157,947

(22) Filed: Oct. 11, 2018

(51) Int. Cl.
*G06F 40/106* (2020.01)
*H04L 29/08* (2006.01)
*H04L 29/06* (2006.01)

(52) U.S. Cl.
CPC .......... *G06F 40/106* (2020.01); *H04L 67/306* (2013.01); *H04L 67/42* (2013.01)

(58) Field of Classification Search
CPC ...... G06F 17/212; H04L 67/306; H04L 67/42
See application file for complete search history.

(56) References Cited

U.S. PATENT DOCUMENTS 10,122,824 B1 * 11/2018 Chokhawala ........... H04L 67/02

\* cited by examiner

*Primary Examiner* — Stella Higgs
(74) *Attorney, Agent, or Firm* — Faegre Drinker Biddle & Reath LLP

(57) ABSTRACT

Systems and Methods of the current disclosure may provide customized webpages. A client device of the system may retrieve a profile corresponding to a user. The client device may further receive a deck including a set of packs, with each pack including a set of cards. As defined herein, a deck corresponds to a workflow (i.e., a series of webpages), while each pack includes context specific user-interface elements which make up a webpage. Further, a card may correspond to one or more elements of the webpage. The client device renders and displays webpages locally by selecting elements to be displayed on the webpage based on a details corresponding to a user of the client device. In other words, the client device creates webpages by selecting one or more cards for each pack of the deck based on details indicated in the profile.

20 Claims, 6 Drawing Sheets

US 10,747,939 B1

DECLARATIVE INTERFACE FOR INTERACTION DESIGN

FIELD OF THE DISCLOSURE

This disclosure relates to a system and method for personalizing content, design, and structure of a webpage.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Typically, webpages are static, meaning that each user visiting the webpage will be presented with the same display. Even webpages that provide followed/subscribed content, such as social media sites, are static and provide posts in the same way to each user. In other words, although users of a social media site may be provided with different content than other users, the provided content is not tailored in any way to the specific user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One embodiment of the techniques of this disclosure is a computer-implemented method for rendering customized webpages. The method may include retrieving a profile a profile indicative of one or more details corresponding to a user. The method may also include retrieving a deck corresponding to a series of webpages, the deck comprising a set of packs, wherein each pack of the set of packs corresponds to a single webpage in the series of webpages, wherein each pack includes a set of cards corresponding to one or more elements to be rendered in the single webpage, and wherein each card includes one or more variations. Further, the method may include selecting, for a pack of the deck, one or more cards from the respective set of cards based in part on the profile. The method may also include rendering a webpage corresponding to the pack of the deck based on the corresponding selected one or more cards for the pack and displaying, via a user-interface of a client device, the webpage.

In another embodiment, of the disclosure, a system for rendering custom webpage may include a client device and a server including one or more processors and one or more memories, the memories including instructions executed on the one or more processors. The instruction may cause the processors to retrieve a profile indicative of one or more details corresponding to a user and a deck corresponding to a series of webpages, the deck comprising a set of packs, wherein each pack of the set of packs corresponds to a single webpage in the series of webpages, wherein each pack includes a set of cards corresponding to one or more elements to be rendered in the single webpage, and wherein each card includes one or more variations. The instructions may further cause the processors to select, for a pack of the deck, one or more cards from the respective set of cards based in part on the profile. Further, the instruction may cause the processors to render a webpage corresponding to the pack of the deck based on the corresponding selected one or more cards for the pack. The instructions may also cause the processors to transmit, for display via a user-interface of the client device, the rendered webpage.

In yet another embodiment of the disclosure a non-transitory, computer-readable medium stores instructions that specifically configure one or more processors of a computer system to render customized webpages. The instruction may cause the system to retrieve a profile indicative of one or more details corresponding to a user and a deck corresponding to a series of webpages, the deck comprising a set of packs, wherein each pack of the set of packs corresponds to a single webpage in the series of webpages, wherein each pack includes a set of cards corresponding to one or more elements to be rendered in the single webpage, and wherein each card includes one or more variations. The instructions may further cause the system to select, for a pack of the deck, one or more cards from the respective set of cards based in part on the profile. Further, the instruction may cause the system to render a webpage corresponding to the pack of the deck based on the corresponding selected one or more cards for the pack. The instructions may also cause the system to transmit, for display via a user-interface of the client device, the rendered webpage.

The features and advantages described in this summary and the following detailed description are not all-inclusive. Many additional features and advantages will be apparent to one of ordinary skill in the art in view of the drawings, specification, and claims hereof.

The figures depict embodiments of the present invention for purposes of illustration only. One skilled in the art will readily recognize from the following discussion that alternate embodiments of the structures and methods illustrated herein may be employed without departing from the principles of the invention described herein.

DETAILED DESCRIPTION

The internet is an important part of modern life. However, there are still many ways to improve a user's web-browsing experience. For example, webpages are typically static, meaning that every user that accesses a site will see the same content, displayed in the same way. The current application aims to offer customized webpages based on a profile of a user accessing the webpage. The webpages of the current disclosure include serialized content which may be transmitted as a number of individual files.

Customized webpages may provide many benefits to both users of the internet and website hosts. A person browsing the internet may have certain preferences and/or demographic information indicated in a user's profile. Customizing webpages according to the user's profile may lead to an enhanced web browsing experience. For example, certain elements of a webpage may not be displayed if the element is irrelevant or if the information is already available in the user's profile. Not only does this benefit the user by filtering unnecessary information from the display, but the computer system may operate faster due to rendering fewer items for display. Further, elements of the webpage may be displayed based on the user's preferences. The webpage maybe tailored based on a user's color preferences, interests, etc., resulting in a webpage that is more satisfying for the user. The benefits to the user experience may also extend to website hosts, as an enhanced user experience may garner larger amounts of traffic to the site.

Figure 1:
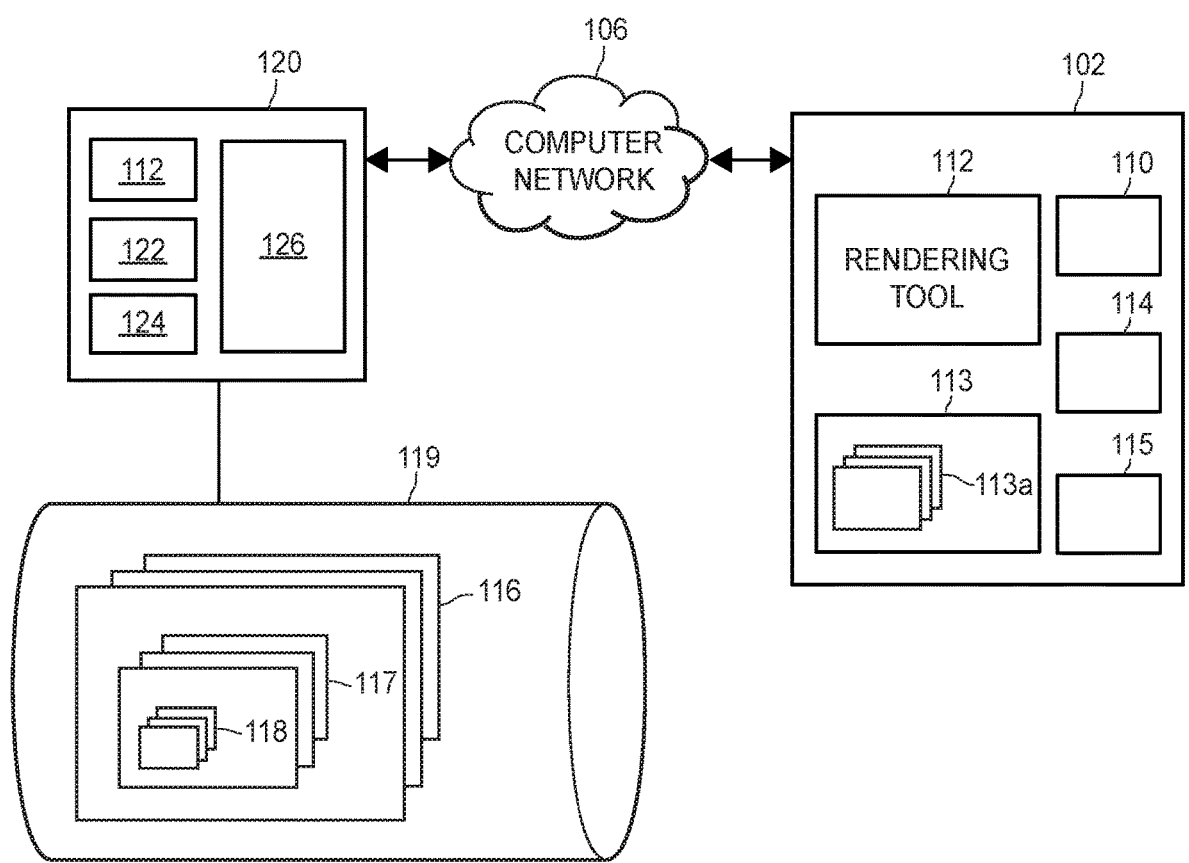
FIG. 1 is a simplified and exemplary block diagram of a system for client-side rendering of customized webpages.

FIG. 1 generally illustrates one embodiment for a system 100 for rendering customized webpages. The system 100 may include front end components (e.g., client device 102) and backend components (e.g., server 120) in communication with each other via a communication link 106 (e.g., computer network, internet connection, etc.). FIG. 1 illustrates a block diagram of a high-level architecture of system 100 for rendering customized webpages including various software or computer-executable instructions and hardware components or modules that may employ the software and instructions for rendering customized webpages. The various modules may be implemented as computer-readable storage memories containing computer-readable instructions (i.e., software) for execution by a processor of the computer system 100. The modules may perform the various tasks associated with rendering customized webpages, as herein described. The computer system 100 also includes both hardware and software applications, as well as various data communications channels for communicating data between the various hardware and software components.

The system 100 may include various entities at the front end that may communicate with the backend components for rendering customized webpages. For example, the front end may contain a client device 102 that is capable of executing a rendering tool 112 and a graphical user interface (UI) 110 within a web browser 114. The client device 102 may be any device used for browsing the internet such as a personal computer, smart phone, tablet computer, etc. The UI 110 may communicate with the system 100 through the Internet 106 or other type of suitable network (local area network (LAN), a metropolitan area network (MAN), a wide area network (WAN), a mobile, a wired or wireless network, a private network, a virtual private network, etc.).

A server 120 may send and receive information and data 119 for the system 100 such as computer-executable instructions and data associated with applications executing on the client device 102 (e.g., the rendering tool 112). The applications executing within the system 100 may include cloud-based applications, web-based interfaces to the data system 116, software applications executing on the client device 102, or applications including instructions that are executed and/or stored within any component of the system 100. The applications, UI 110, browser 114, and rendering tool 112 may be stored in various locations including separate repositories and physical locations.

In some embodiments, the system 100 in general and the server 120 in particular may include computer-executable instructions 122 stored within a memory 124 of the server 120 and executed using a processor 126. The instructions 122 may send instructions to the client device 102 to instantiate a rendering tool 112 in the UI 110 using a web browser application 114 of a client device 102. In some embodiments, the browser application 114, UI 110, rendering tool 112, and elements of the system 100 may be implemented at least partially on the server 120 and/or the client device 102. The data system 100 and processor 126 may execute instructions 122 to display the UI 110 including customized webpages within a display of the client device 102. The UI 110 may allow a user to interact with the customized webpages and create further customized webpages based, at least in part, on user inputs.

The server 120 may be communicatively coupled to a server database 119. The server database 119 may store decks 116 which include packs 117 which include cards 118. Decks 116 may correspond to a so-called "work flow," defined herein as a series of webpages implemented to receive a sequence of user actions which occur in a specific context (e.g., a checkout process on an e-commerce site). Packs 117 include a collection of context specific user-interface elements which make up a webpage. In an embodiment, each pack 117 corresponds to a webpage of the series of webpages in a deck 116. Although the packs 117 are described as corresponding to a webpage, each pack may not necessarily correspond to a unique URL. As used herein, each pack may correspond to a webpage from the user's point of view (i.e., a unique display interface). However the web browser may not need to refresh in the manner typically associated with opening a new webpage. In the example of a checkout process, one pack might correspond to a payment entry webpage, while another pack corresponds to a shipping address entry webpage, and so on. In this example, the web browser of the client device may not necessarily refresh when moving from one pack to the next.

Cards 118 correspond to interface elements of a webpage. In an embodiment, each pack 117 includes a set of cards 118. Cards 118 may correspond to presentational and functional components of webpages including images, fonts, fields, colors, icons, links, layouts and other elements corresponding to a webpage, discussed in greater detail below. Further, each card can include multiple variations, where each variation includes a different representation of the corresponding presentational and/or functional component of the webpage. Cards 118 may also be linked to other cards 118 (either in the same pack 117 or in other packs 117), as described in greater detail below with respect to FIG. 4. In an embodiment, each card 118 may be a function (i.e., a unit of code or other data) which may include one or more of a configuration section, component markup, and/or CSS (Cascading Style Sheet). In one embodiment, each card may be stored in an individual file. In another embodiment, two or more cards may be stored in a file. Further, each card 118 may correspond to a weight (discussed in greater detail below), stored either within the card 118 or in the pack 117.

The client device 102 may also include a memory 113 including one or more profiles 113a. A profile 113a includes details corresponding to a user such as preferences and/or demographic information. For example, a profile 113a may include details including demographic information corresponding to a user such as a name, address, marital status, salary, etc. Further, the profile 113a may also include details corresponding to preferences such as hobbies, interests, color preferences, etc. Although the profiles 113a are shown as being stored locally on the client device 102, this is merely illustrative and the profiles may be stored at any suitable memory throughout the system. For example, the client device 102 may retrieve profiles from database 119 via server 120.

The rendering tool 112 may include various instructions for execution by a processor 115 and/or 126 for rendering customized webpages. For example, the server 120 may implement the rendering tool 112 to retrieve a profile 113a. Next, the server 120 may implement the rendering tool 112 to select any combination of decks 116, packs 117, and cards 118 from database 119, where the selection is based at least partially on the retrieved profile 113a. The client device 102 may then implement the rendering tool 112 to render one or more webpages based on the selected decks 116, packs 117 and cards 118. In some embodiments, the server 120 may implement the rendering tool 112 to render some, or all, of the one or more webpages before sending the selected decks 116, packs 117, and cards 118 to the client device 102.

Figure 2:
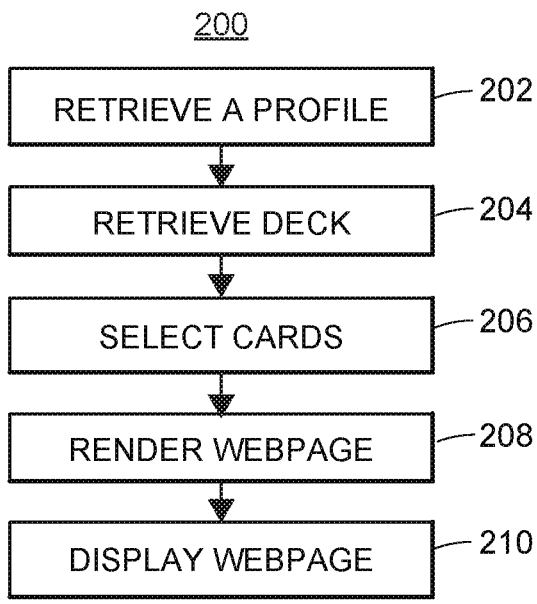
FIG. 2 is a block diagram of an example method for client-side rendering of customized webpages.

Referring now to FIG. 2, example method 200 for rendering of customized webpages is discussed in greater detail. The method 200 may include one or more functions or routines in the form of non-transitory computer-executable instructions that are stored in a tangible computer-readable storage medium and executed using a processor of a computing device (e.g., the client device 102, the server 120, or any combination of computing devices within the system 100). The routines may be included as part of any of the modules described in relation to FIG. 1, above, or FIG. 7 or 8, below, or as part of a module that is external to the system illustrated by FIGS. 1, 7, and 8. For example, the method 200 may be part of a browser application or another application running on the client device 102 as a plug-in or other module of the browser application.

FIG. 2 is a flow diagram of an example method 200 for rendering customized webpages. The method may begin by retrieving a profile indicative of one or more details corresponding to a user, such as the profile 113a of FIG. 1 (block 202). The profile may be retrieved in response to a user accessing a webpage, opening a web browser, opening a software program on a client device, or performing any other action that indicates that a user could be accessing a webpage or series of webpages corresponding to a deck. As described above, the profile may include details corresponding to a user, including information regarding user preferences and/or user demographics.

The preference details of the profile may indicate colors, layouts, graphics, etc. that are relevant to the user. The demographic details may also indicate information about the user which may be relevant in customizing webpages for the user. In some embodiments, the preference details and demographic details of the profile may be completed by the user. In other embodiments, the preference details and demographic details of the profile may be collected based on data corresponding to a user. In this embodiment, a machine learning algorithm, or other technique, may be used to complete the data associated with the user profile.

The profile may be stored locally in the client device, in a memory of the server, and/or in a memory communicatively coupled to the server/client device. In an embodiment, the rendering tool may receive an indication of a user login and subsequently retrieve a profile corresponding to the login. In another embodiment, the profile may be specifically associated with the client device.

Next, the system may retrieve a deck, such as deck 116 of FIG. 1 (block 204). The deck may be retrieved, for example, in response to a user accessing a particular website via a web browser. The deck may include a set of packs, and each pack of the set of packs may include a set of cards. An example deck is described in greater detail below with respect to FIG. 3. The system may then select one or more cards for a pack of the deck (block 206). Typically, the server will select the one or more cards for each pack prior to the webpage corresponding to the pack being displayed to the user. The selection of cards is typically only done once for each pack and is completed right before the webpage corresponding to the pack is to be displayed. By only performing this operation once, the system reduces processing power consumption and operates more efficiently. Card selection is discussed in greater detail with respect to FIG. 4, below.

The system may then render a webpage corresponding to the first pack in the deck (block 208). The webpage may be rendered at the backend server and then sent to the client device for display. In another embodiment, the server may transmit the selected cards for each pack to the client device to be rendered at the front end. In other embodiments, the webpage may be partially rendered at the server and the deck, the selected cards, and partially rendered webpage may be sent to the client device to complete rendering and to display the webpage. The system may render the webpage by executing the data/code/instructions in the particular pack and the one or more selected cards corresponding to the particular pack.

In some embodiments, the pack may only contain instructions to be executed within the one or more selected cards. In another embodiment, the packs may contain instructions to be executed in addition to the one or more selected cards. The instructions may be in a coding language contained within any of the decks, packs and cards of the system may be any suitable language or combinations of languages used for programming webpages.

The rendered webpage may then be displayed via a user-interface of the client device (block 210). The system may receive user inputs and/or other indications through the user-interface. The system may implement the inputs for card selection for subsequent packs. For example, a user entering personal information to receive an online insurance quote may enter an input, within a first pack, indicating that the user is not married. Subsequently, the system may not select one or more cards for one or more other packs that correspond to text fields for receiving information corresponding to a spouse.

The system may repeat steps 204-210 of the method to continue to select cards for packs as a user progress through the workflow, using newly acquired information from user inputs, along with the profile, to determine which cards should be selected.

Figure 3:
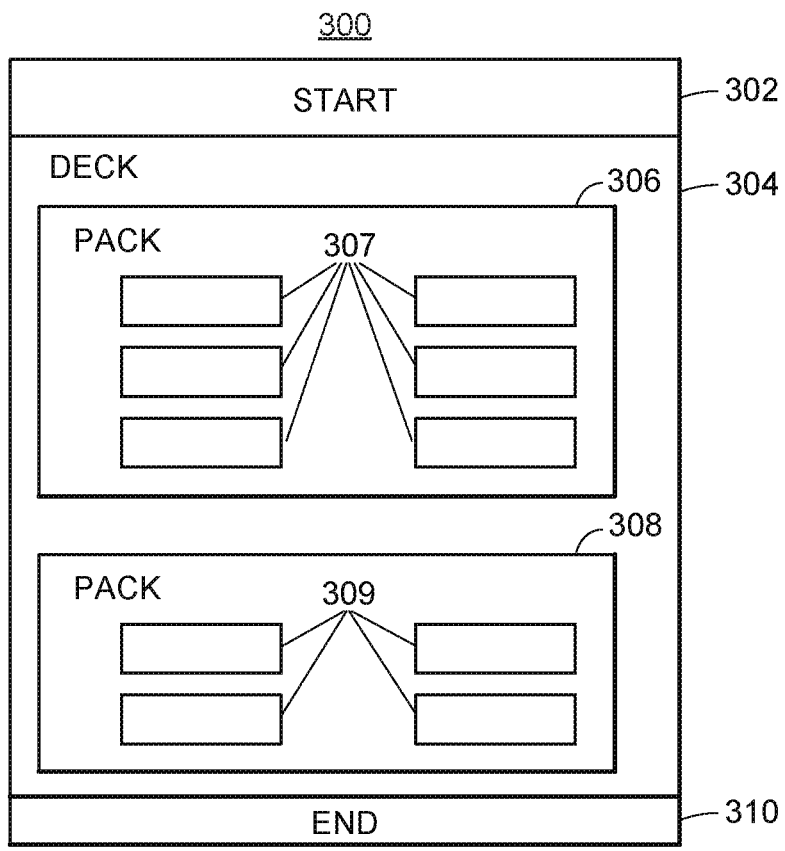
FIG. 3 is a schematic diagram illustrating an example workflow including a deck, packs and cards.

FIG. 3 is a schematic diagram illustrating an example workflow 300 including a deck 304, packs (306, 308) and cards (307, 309). A workflow is a series of webpages to be presented to a user, such as a checkout process on an e-commerce site, an online job application, etc. A deck 304 represents the entirety of the workflow and contains all of the packs (306, 308) and cards (307, 309) for the workflow. A pack (306, 308) typically represent a single webpage within the workflow, while the cards (307, 309) correspond to the individual functional and/or presentational elements of the webpage. Completing each pack (306, 308) of the deck 304 is equivalent to completing the workflow.

Packs (306, 308) correspond to individual webpages of the workflow and include several cards (307, 309) corresponding to various elements of the webpage. As mentioned above, although a pack is described as corresponding to a webpage, the pack does not necessarily need to correspond to a unique URL. Instead, each pack corresponds to a new user-interface to be presented on the client device to the user. In this manner, the system may move from one pack to the next within the deck (i.e., render and display new user-interfaces) without causing the browser to refresh.

The cards (307, 309) within a pack (306, 308) may be linked or independent of one another. As described above, cards (307, 309) may correspond to functional or presentational components of a webpage. In an example embodiment, a user would not access the webpage corresponding to deck 308 until all of the functional cards 307 of deck 306 have been completed. In an embodiment, this may include filling out text fields, clicking icons, selecting a toggle button, etc. Once all of the functional cards (307, 309) of the deck 304 are complete, the workflow is done.

Figure 4:
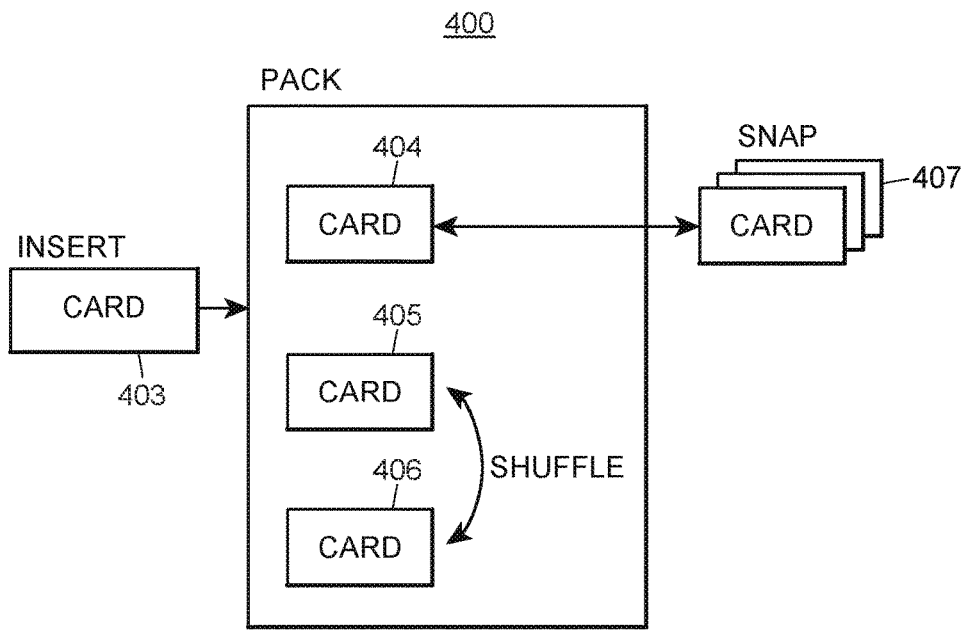
FIG. 4 is a schematic diagram illustrating an example card selection for a pack.

FIG. 4 is a schematic diagram 400 illustrating an example card selection for a pack 402. Each pack in the deck may serve a particular purpose. For example, a pack 402 may be aimed at collecting three pieces of information (e.g., name, date or birth, address). In this example, the pack 402 must contain at least three cards corresponding to the above information. However, the system may not simply select three cards as there may be many variations of each card. For example, with regard to receiving a user's name, card 404 may include the text "enter name" while other variations of the card, within the stack of cards 407, may simply say "name," or indicate formatting by stating "last name, first name." Further, other variations of the cards may include the same text but in different colors and/or fonts. The system must determine which cards to select based on the information to be collected for pack 402 and the user profile (as discussed above).

The system may analyze a number of factors when selecting cards for a pack 402. In one embodiment, the system may consider the weight of each card, discussed in greater detail below. In another embodiment, the system may analyze details included in a profile (such as profile 113a of FIG. 1) to determine which cards should be selected. For example, the system may determine, based on the profile, that a user always enters their full name into similar fields, and thus one of the cards from the stack of cards 407 including simply the text "name" is the best option, and the card 404 should be swapped out for the more appropriate variation of the card 404 in stack 407. In another embodiment, the system may be able to retrieve the user's name from the profile and can provide a card 404 with the user's name automatically populated. In still another embodiment, the system may select a card based on a color scheme indicated in the user's profile (or based on a color scheme related to a favorite sports team indicated in the user's profile). In another embodiment, the system may select a card based on a preferred language indicated in the user's profile. Essentially, the user's profile can include a wide variety of information and the system may select from a large number of card variations based, at least in part, on information contained in the user's profile.

In some embodiments, the system may determine that the pack 402 will not retrieve the necessary information for the pack with the current number of selected cards. In another embodiment, the system may determine that the pack 402 should include an additional presentational element. In either of the above embodiments, the system may add an additional card 403 to the pack 402 to complete the pack 402. In other words, the system may select any number of cards for a pack in order to create a customized webpage.

In some embodiments, the system may determine that the current layout of the pack 402 is not favorable to the user based on the details in the profile or based on other information. The system may then swap cards, such as cards 405 and 406, for example. To create an optimal customized webpage the system may swap cards out, remove cards, insert additional cards, or shuffle cards within the deck, as described above. Further, the system may perform any other suitable operation for selecting one or more cards for a deck 402.

A pack may contain data independent of the cards which may indicate basic elements of the webpage to be displayed. For example, a pack may include data indicating a background color and a menu toolbar. In another embodiment, each and every element of a displayed website may correspond to data from one or more selected cards. For example, a card may indicate a graphic display, a text input field, a selectable icon, a selectable link, a font, a color, a layout, a background color, etc. By selecting cards for each pack, the system is designing a completely customized webpage for each webpage in the entire workflow.

In some embodiments, cards may be linked to other cards. Cards may be linked to other cards from the same pack or in other packs. In some embodiments, the cards may be linked to a specific variation of a card, or to all variations of a card. A card may also be linked to one or more so-called "ancestor" cards. In an embodiment, a card cannot be selected for a pack unless all of the corresponding ancestor cards have been selected. For example, a card corresponding to a text field for entering a spouse's date of birth cannot be selected unless an ancestor card corresponding to a question of marital status has been previously selected. Further, cards may be linked to "descendant" cards. In an embodiment, if a card is selected, all of the corresponding descendant cards should also be selected. For example, if a card corresponding to address field is selected, then descendent cards corresponding to a city, a state, and a zip code should all be selected as well.

The data linking cards to other cards may be included in the configuration section of the card. Specifically, the data to link one card to another may indicate a deck number, a pack number, a card number and a version number. The deck number may be used to assign the link to a specific workflow. The pack number may be used to assign a card to a specific pack within the deck. The card number may be used to referrer to the functionality of the linked card. The version number may refer to a specific design of a card given all the other previous information.

For example, a card data may include "Link: 1-1-1-4," which would indicate that the card is linked to a card in deck 1, pack 1, card 1, version 4. As an example, deck 1 may correspond to a checkout process, pack 1 may correspond to the personal information section, and card 1 may correspond to a name text field. In this example, the card including "Link: 1-1-1-4" would be linked to a card that corresponds to the fourth version of a card that corresponds to a name text field on the personal information page of a checkout process.

The links between cards can be as specific as the example provided above, or more general. For example, a card may include a link "1-1-2-*" which would indicate a link where the particular version of the linked card is irrelevant. In another embodiment, a card may include a link "1-1-2-[2-6]," which would indicate a link to only a few specific versions (namely versions two through six) of the linked card. A card may contain any number of links, where each link is of any acceptable format. The system may analyze the number and kinds of links in all of the cards in a deck to determine a weight for each card. For example, if a specific card is linked to by a high number of other cards in the deck, then that card will have a large weight. Similarly, if a card is not linked to at all, then it may be assigned a lower weight.

Figure 5:
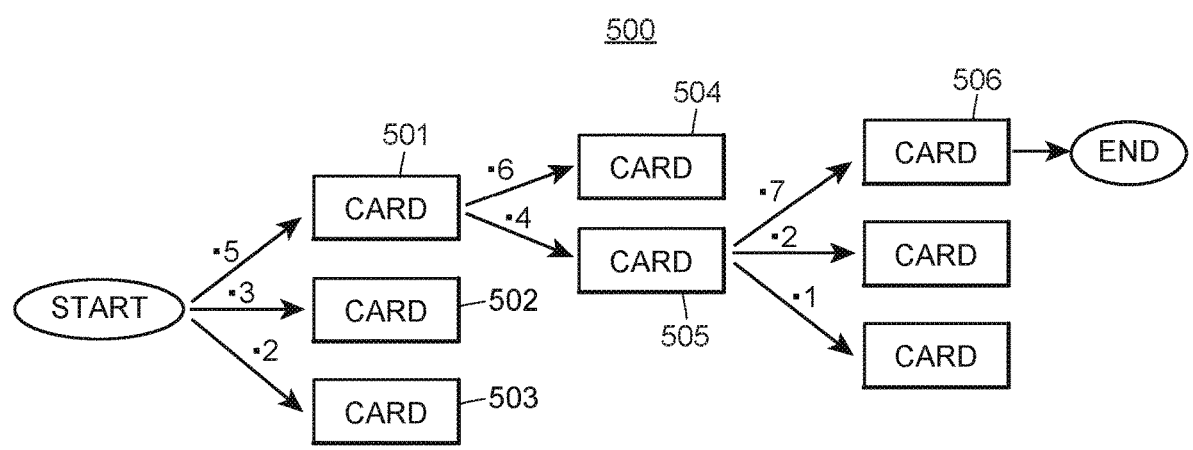
FIG. 5 is a schematic diagram illustrating an example probability tree diagram for selecting cards for a pack.

FIG. 5 is a schematic diagram 500 illustrating an example probability tree diagram for selecting cards for a pack. The system may start by selecting a first card for the deck. In an embodiment, the first card selected may correspond to a card in the first pack of the deck. In another embodiment, the selection process of diagram 500 may begin after a user has already completed a few webpages in the workflow as the system selects cards as user inputs are received. For example, if a user indicates that they do not own a car, cards corresponding to vehicle information may be removed from subsequent packs in the deck.

In the example diagram 500, cards 501, 502, and 503 have weights of 0.5, 0.3, and 0.2, respectively. The system may not necessarily choose the card with the highest weight, as other factors (e.g., the retrieved profile) may be considered in the card selection process. If card 501 is chosen, one of cards 504 or 505 may be selected next. In an embodiment, cards 504 and 505 may be descendants of card 501. In another embodiment, card 501 may be an ancestor of cards 504 and 505. If the system subsequently selects cards 505 and 506, the selection process may be completed. However, any number of cards may selected and the selection process may be completed any number of times necessary to select the appropriate number of cards for the deck. The example diagram 500 is illustrated to show how the weights of cards are interrelated and is not intended as limiting example of card selection.

Further, the server may transmit an indication of the selected cards to the client device. In some embodiments, the server may then recalculate the weights of cards based on the selected cards. The new weights for each of the cards may then be stored in a database (such as server database 119 of FIG. 1). In an embodiment, the weights may also be randomly increased/decreased to promote new combinations of card selections.

Figure 6:
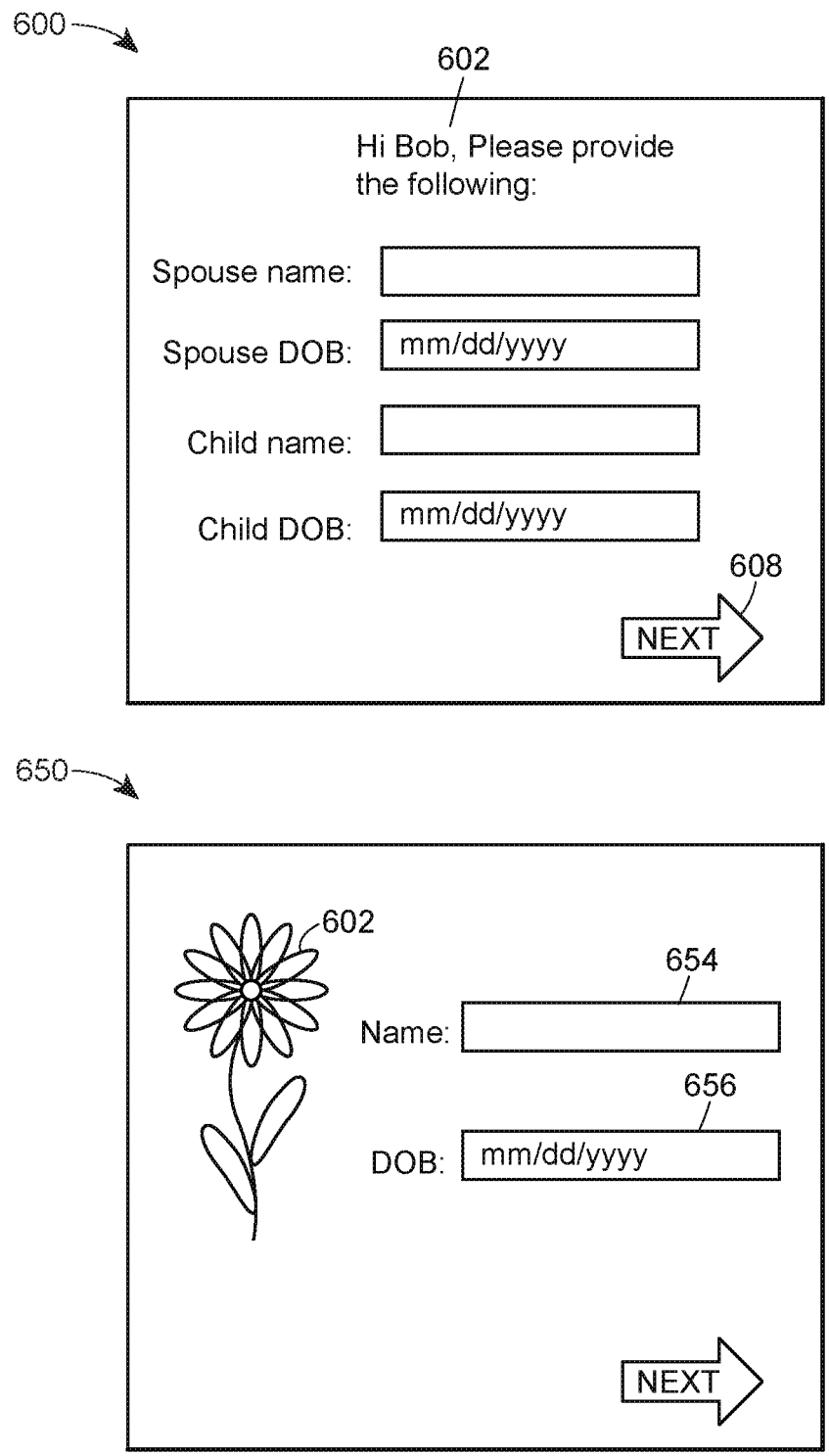
FIG. 6 is an illustration of two example customized webpages rendered using the client-side rendering for customized webpages as disclosed herein.

FIG. 6 is an illustration of two example customized webpages (600, 650) rendered using the client-side rendering for customized webpages as disclosed herein. Webpage 600 may correspond to a first user corresponding to a first profile while webpage 650 may correspond to a second user corresponding to a second profile. In an embodiment, every element displayed in webpages 600 and 650 may correspond to a selected card. For example, even the icon 608 may correspond to a selected card. However, in another embodiment, the icon 608 may correspond to data in the pack not included within a card.

Referring to webpage 600, the first profile may include details like the user's name. Subsequently, webpage 600 does not include a text field for entering a name. Instead, the user's name is displayed as part of an introductory message to the user. This may indicate that the system did not select a card corresponding to a name text field for the pack corresponding to webpage 600, but that the system did select a card corresponding to the introductory message 602. Further, webpage 600 includes fields for receiving information corresponding to a spouse 604 and to a child 606. The first profile may include demographic details indicating that the user is married and is a parent. Thus, the system has selected cards corresponding fields 604 and 606.

Referring now to webpage 650, the graphic 652 may correspond to a card that was selected based on personal details from the second profile. For example, the profile may include personal details indicating that the user enjoys gardening, and thus the system selected the card corresponding to the flower graphic 652. Further, the second profile may not be as thoroughly completed as demographic data as the first profile, and thus fields for entering a name 654 and date of birth 656 are provided in order to retrieve the respective information.

In an embodiment, both webpage 600 and 650 may have been accessed by entering the same URL or clicking the same link on different devices. However, due to the system and method for rendering of customized webpages enabled by the current disclosure, each user may be displayed a unique webpage. For example, the user of webpage 600 is spared from having to enter known information, while the user of webpage 650 is provided with a webpage that is more aesthetically tailored to their interests.

Figure 7:
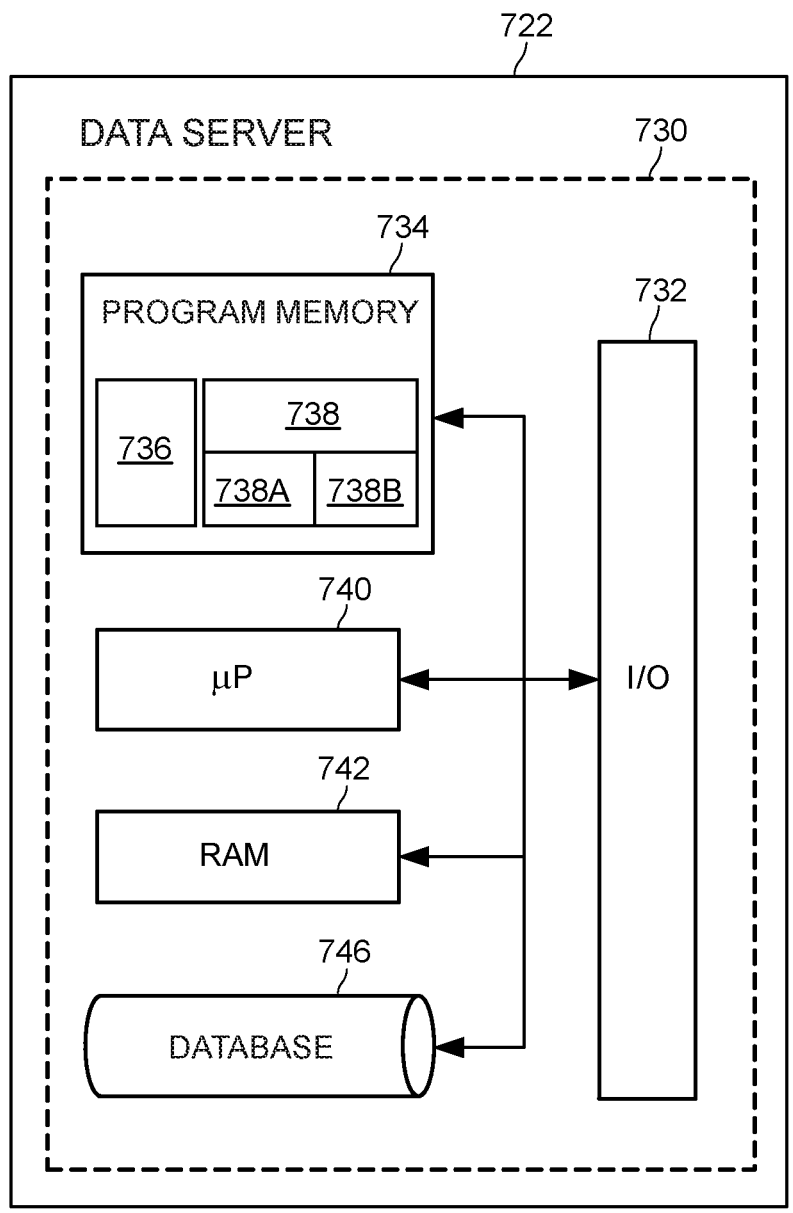
FIG. 7. is an exemplary architecture of a server of a system for client-side rendering of customized webpages.

Referring now to FIG. 7, a data server, such as server 120 of FIG. 1, includes a controller 730. The controller 730 includes a program memory 734, a microcontroller or a microprocessor (µP) 740, a random-access memory (RAM) 742, and an input/output (I/O) circuit 732, all of which are interconnected via an address/data bus 744. The program memory 734 may store computer-executable instructions, which may be executed by the microprocessor 740. In some embodiments, the controller 730 may also include, or otherwise be communicatively connected to, a database 746 or other data storage mechanism (one or more hard disk drives, optical storage drives, solid state storage devices, etc.). The database 746 may include data such as decks, packs, cards, as described above. It should be appreciated that although FIG. 7 depicts only one microprocessor 740, the controller 730 may include multiple microprocessors 740. Similarly, the memory 734 of the controller 730 may include multiple RAMs 736 and multiple program memories 738, 738A and 738B storing one or more corresponding server application modules, according to the controller's particular configuration.

Although FIG. 7 depicts the I/O circuit 732 as a single block, the I/O circuit 732 may include a number of different types of I/O circuits (not depicted), including but not limited to, additional load balancing equipment, firewalls, etc. The RAM(s) 736, 742 and the program memories 738, 738A and 738B may be implemented in a known form of computer storage media, including but not limited to, semiconductor memories, magnetically readable memories, and/or optically readable memories, for example, but does not include transitory media such as carrier waves.

Figure 8:
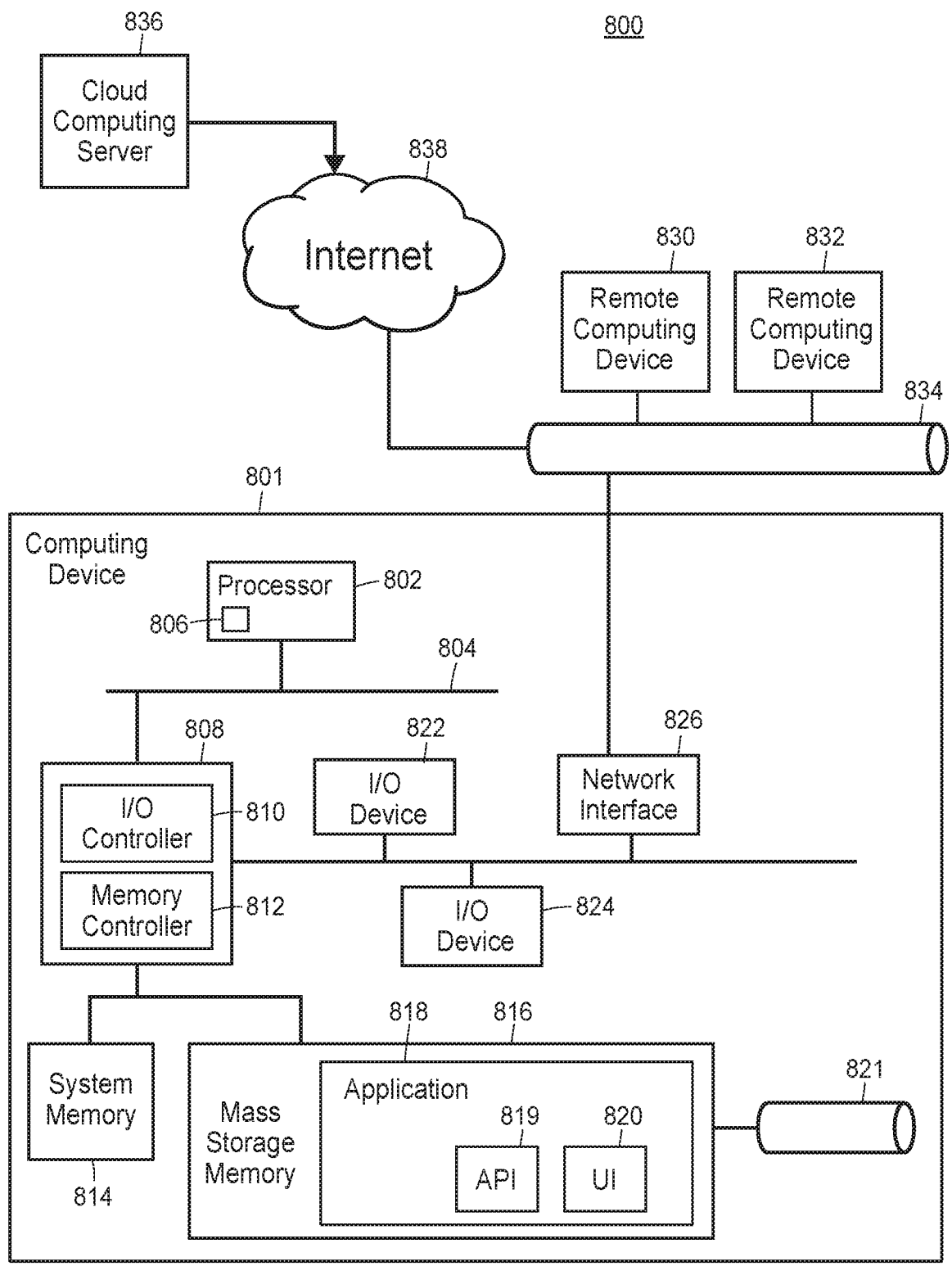
FIG. 8. illustrates a block diagram of a computer to implement the various user interfaces, methods, functions, etc., for client-side rendering of customized webpages in accordance with the described embodiments.

FIG. 8 illustrates an exemplary computing environment (e.g., client device 102 of FIG. 1) for implementing the system 100 and method 200 as described herein. As shown in FIG. 8, the computing device 801 includes a processor 802 that is coupled to an interconnection bus 804. The processor 802 includes a register set or register space 806, which is depicted in FIG. 8 as being entirely on-chip, but which could alternatively be located entirely or partially off-chip and directly coupled to the processor 802 via dedicated electrical connections and/or via the interconnection bus 804. The processor 802 may be any suitable processor, processing unit or microprocessor. Although not shown in FIG. 8, the computing device 801 may be a multi-processor device and, thus, may include one or more additional processors that are identical or similar to the processor 802 and that are communicatively coupled to the interconnection bus 804.

The processor 802 of FIG. 8 is coupled to a chipset 808, which includes a memory controller 812 and a peripheral input/output (I/O) controller 810. As is well known, a chipset typically provides I/O and memory management functions as well as a plurality of general purpose and/or special purpose registers, timers, etc. that are accessible or used by one or more processors coupled to the chipset 808. The memory controller 812 performs functions that enable the processor 802 (or processors if there are multiple processors) to access a system memory 814 and a mass storage memory 816.

The system memory 814 may include any desired type of volatile and/or non-volatile memory such as, for example, static random access memory (SRAM), dynamic random access memory (DRAM), flash memory, read-only memory (ROM), etc. The mass storage memory 816 may include any desired type of mass storage device. For example, if the computing device 801 is used to implement a rendering tool 818 having an API 819 (including functions and instructions as described by the method 200 of FIG. 2), and user interface 110 to receive user input, the mass storage memory 816 may include a hard disk drive, an optical drive, a tape storage device, a solid-state memory (a flash memory, a RAM memory, etc.), a magnetic memory (e.g., a hard drive), or any other memory suitable for mass storage. In one embodiment, non-transitory program functions, modules and routines (an application 818, an API 819, and the user interface 110, etc.) are stored in mass storage memory 816, loaded into system memory 814, and executed by a processor 802 or can be provided from computer program products that are stored in tangible computer-readable storage mediums (RAM, hard disk, optical/magnetic media, etc.). Mass storage 816 may also include a cache memory 821 storing application data, user profile data, and other data for use by the application 818.

The peripheral I/O controller 810 performs functions that enable the processor 802 to communicate with peripheral input/output (I/O) devices 822 and 824, a network interface 826, via a peripheral I/O bus 828. The I/O devices 822 and 824 may be any desired type of I/O device such as a keyboard, a display (a liquid crystal display (LCD), a cathode ray tube (CRT) display, etc.), a navigation device (a mouse, a trackball, a capacitive touch pad, a joystick, etc.), etc. The I/O devices 822 and 824 may be used with the application 818 to render customized webpages as described in relation to the figures. The local network transceiver 828 may include support for Wi-Fi network, Bluetooth, Infrared, cellular, or other wireless data transmission protocols. In other embodiments, one element may simultaneously support each of the various wireless protocols employed by the computing device 801. For example, a software-defined radio may be able to support multiple protocols via downloadable instructions. In operation, the computing device 801 may be able to periodically poll for visible wireless network transmitters (both cellular and local network) on a periodic basis. Such polling may be possible even while normal wireless traffic is being supported on the computing device 801. The network interface 826 may be an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 812 and the I/O controller 810 are depicted in FIG. 8 as separate functional blocks within the chipset 808, the functions performed by these blocks may be integrated within a single integrated circuit or may be implemented using two or more separate integrated circuits. The system 800 may also implement the user interface 110 and heat map tool 112 on remote computing devices 830 and 832. The remote computing devices 830 and 832 may communicate with the computing device 801 over a network link 834. For example, the computing device 801 may receive a user profile from one or more of remote computing device 830, 832. In some embodiments, the application 818 including the user interface 110 and tool 112 may be retrieved by the computing device 801 from a cloud computing server 836 via the Internet 838. When using the cloud computing server 836, the retrieved application 818 may be programmatically linked with the computing device 801. The rendering tool application 818 may be a Java® applet executing within a Java® Virtual Machine (JVM) environment resident in the computing device 801 or the remote computing devices 830, 832. The application 818 may also be "plug-ins" adapted to execute in a web-browser located on the computing devices 801, 830, and 832. In some embodiments, the application 818 may communicate with backend components 840 such as the data system 104 via the Internet 838 or other type of network.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the computer network 106, may include but is not limited to any combination of a LAN, a MAN, a WAN, a mobile, a wired or wireless network, a private network, or a virtual private network. Moreover, while only one client computing device is illustrated in FIG. 1 to simplify and clarify the description, it is understood that any number of client computers or display devices are supported and can be in communication with the server 120.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment. For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process rendering customized webpages through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the above text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed:

1. A computer-implemented method for rendering customized webpages, the method comprising:
retrieving a profile indicative of one or more details corresponding to a user;
retrieving a deck corresponding to a series of webpages, the deck comprising a set of packs, wherein each pack of the set of packs corresponds to a single webpage in the series of webpages, wherein each pack includes a set of cards corresponding to one or more elements to be rendered in the single webpage, and wherein each card includes one or more variations and a linkage indication corresponding to an amount of linkages between each card to one or more other cards of a plurality of cards in the deck;
assigning a weight to each card based at least in part upon their linkage indication such that a larger weight corresponds to a greater amount of linkages and a lower weight corresponds to a lesser amount of linkages;
selecting, for a pack of the deck, one or more cards from the respective set of cards based in part on the profile and the weight of each card;
rendering a webpage corresponding to the pack of the deck based on the corresponding selected one or more cards for the pack; and
displaying, via a user-interface of a client device, the webpage.

2. The computer-implemented method of claim 1, further comprising:
receiving, via the user-interface of the client device, one or more user inputs; and
selecting one or more cards from the set of cards corresponding to a second pack from the deck based on the profile and the one or more user inputs.

3. The computer-implemented method of claim 1, wherein each card of the set of cards may include an indication of a reference to one or more other cards of the set of cards.

4. The computer-implemented method of claim 1, wherein each card of the set of cards is a function including a configuration section.

5. The computer-implemented method of claim 1, wherein each card of the set of cards includes an indication of one or more of: a graphic display, a text input field, a selectable icon, a selectable link, a font, a color, or a layout.

6. The computer-implemented method of claim 1, further comprising:
transmitting, via the computer network, an indication of each of the one or more selected cards for the pack of the deck from a server to the client device.

7. The computer-implemented method of claim 6, further comprising:
storing, at a database communicatively coupled to the server, the indication of each of the selected cards; and
altering, a weight for each card that was indicated as selected.

8. A system for rendering customized webpages, the system comprising:
a client device; and
a server including one or more processors and one or more memories, the memories including instructions executed on the one or more processors to:
retrieve a profile indicative of one or more details corresponding to a user;

retrieve a deck corresponding to a series of webpages, the deck comprising a set of packs, wherein each pack of the set of packs corresponds to a single webpage in the series of webpages, wherein each pack includes a set of cards corresponding to one or more elements to be rendered in the single webpage, and wherein each card includes one or more variations and a linkage indication corresponding to an amount of linkages between each card to one or more other cards of a plurality of cards in the deck;

assign a weight to each card based at least in part upon their linkage indication such that a larger weight corresponds to a greater amount of linkages and a lower weight corresponds to a lesser amount of linkages;

select, via the one or more processors, for a pack of the deck, one or more cards from the respective set of cards based in part on the profile and the weight of each card;

render, via the one or more processors, a webpage corresponding to the pack of the deck based on the corresponding selected one or more cards for the pack; and transmit, for display via a user-interface of the client device, the rendered webpage.

9. The system of claim 8, further comprising instructions to:

receive, via the user-interface of the client device, one or more user inputs; and select, via the one or more processors, one or more cards for a second pack from the set of packs based on the profile and the one or more user inputs.

10. The system of claim 8, wherein a card of the set of cards includes an indication of a reference to one or more other cards of the set of cards.

11. The system of claim 8, wherein each card of the set of cards is a function including a configuration section.

12. The system of claim 8, wherein each card of the set of cards includes an indication of one or more of: a graphic display, a text input field, a selectable icon, a selectable link, a font, a color, or a layout.

13. The system of claim 8, further comprising instructions to:

transmit, to the client device via a computer network, an indication of each of the one or more selected card for the pack of the deck.

14. The system of claim 13, further comprising instructions to:

store, at a database communicatively coupled to the server, the indication of each of the selected cards; and alter a weight for each card that was indicated as selected.

15. A non-transitory computer-readable medium storing instructions on a tangible computer-readable medium for rendering customized webpages, the instructions to: retrieve a deck corresponding to a series of webpages, the deck comprising a set of packs, wherein each pack of the set of packs corresponds to a single webpage in the series of webpages, wherein each pack includes a set of cards corresponding to one or more elements to be rendered in the single webpage, and wherein each card includes one or more variations and a linkage indication corresponding to an amount of linkages between each card to one or more other cards of a plurality of cards in the deck; assign a weight to each card based at least in part upon their linkage indication such that a larger weight corresponds to a greater amount of linkages and a lower weight corresponds to a lesser amount of linkages; select, for a pack of the deck, one or more cards from the respective set of cards based in part on the profile and the weight of each card; render a webpage corresponding to the pack of the deck based on the corresponding selected one or more cards for the pack; and display, via a user-interface, the webpage.

16. The non-transitory computer-readable medium of claim 15, further comprising instructions to: receive, via the user-interface, one or more user inputs; and select one or more cards from the set of cards for a second pack from the set of packs based on the profile and the one or more user inputs.

17. The non-transitory computer-readable medium of claim 15, wherein a card of the set of cards includes an indication of a reference to one or more other cards of the set of cards.

18. The non-transitory computer-readable medium of claim 15, wherein each card of the set of cards is a function including a configuration section.

19. The non-transitory computer-readable medium of claim 15, wherein each card of the set of cards includes an indication of one or more of: a graphic display, a text input field, a selectable icon, a selectable link, a font, a color, or a layout.

20. The non-transitory computer-readable medium of claim 15, further comprising instructions to: transmit, via the computer network, an indication of each of the one or more selected cards for the pack of the deck from a server to the client device.

* * * * *